US006970871B1

(12) United States Patent
Rayburn

(10) Patent No.: US 6,970,871 B1
(45) Date of Patent: Nov. 29, 2005

(54) SYSTEM AND METHOD OF SORTING INFORMATION BASED ON A LOCATION OF A MOBILE STATION

(75) Inventor: Terry Rayburn, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 489 days.

(21) Appl. No.: 10/120,982

(22) Filed: Apr. 11, 2002

(51) Int. Cl.[7] ............................ G06F 17/30; G06F 7/00
(52) U.S. Cl. ..................... 707/10; 707/3; 707/104.1; 455/456.3
(58) Field of Search ....... 707/1–206; 455/456.1–456.3

(56) References Cited

U.S. PATENT DOCUMENTS

| | | | | |
|---|---|---|---|---|
| 5,173,691 | A | * | 12/1992 | Sumner ..................... 340/905 |
| 5,365,516 | A | * | 11/1994 | Jandrell ..................... 370/335 |
| 6,049,711 | A | * | 4/2000 | Ben-Yehezkel et al. .. 455/414.3 |
| 6,108,533 | A | * | 8/2000 | Brohoff .................... 455/414.3 |
| 6,169,894 | B1 | * | 1/2001 | McCormick et al. ..... 455/414.1 |
| 6,343,317 | B1 | * | 1/2002 | Glorikian ................... 709/218 |
| 6,351,647 | B1 | * | 2/2002 | Gustafsson ................. 455/466 |
| 6,397,040 | B1 | * | 5/2002 | Titmuss et al. .......... 455/67.11 |
| 6,434,381 | B1 | * | 8/2002 | Moore et al. ............ 455/414.3 |
| 6,446,076 | B1 | * | 9/2002 | Burkey et al. .............. 707/102 |
| 6,477,374 | B1 | * | 11/2002 | Shaffer et al. .............. 455/445 |
| 6,499,051 | B1 | * | 12/2002 | Kanemitsu .................. 709/203 |
| 6,535,743 | B1 | * | 3/2003 | Kennedy et al. ......... 455/456.1 |
| 6,571,279 | B1 | * | 5/2003 | Herz et al. .................. 709/217 |
| 6,580,914 | B1 | * | 6/2003 | Smith ....................... 455/456.6 |
| 6,609,005 | B1 | * | 8/2003 | Chern ......................... 455/457 |
| 6,643,650 | B1 | * | 11/2003 | Slaughter et al. ............. 707/10 |
| 6,681,114 | B2 | * | 1/2004 | Chang et al. ............ 455/456.3 |
| 6,725,050 | B1 | * | 4/2004 | Cook ....................... 455/456.1 |
| 6,772,213 | B2 | * | 8/2004 | Glorikian ................... 709/228 |
| 6,789,077 | B1 | * | 9/2004 | Slaughter et al. ............. 707/10 |
| 6,789,102 | B2 | * | 9/2004 | Gotou et al. ................ 709/203 |
| 6,792,466 | B1 | * | 9/2004 | Saulpaugh et al. ......... 709/229 |
| 6,862,594 | B1 | * | 3/2005 | Saulpaugh et al. ........... 707/10 |
| 2004/0139049 | A1 | * | 7/2004 | Hancock et al. ............... 707/1 |

OTHER PUBLICATIONS

Meland, M. "Tapping the Local Markets", Forbes.com, downloaded from www.forbes.com, Feb. 9, 2000.*
Chervokas, J. "Start-Up Puts Content Network in Your Pants", Silicon Alley News, downloaded from www.atnewyork.com, Mar. 10, 2000.*
Hammer, B. "Pinpointing Trouble", The Industry Standard, downloaded from www.thestandard.com, May 29, 2000.*
Parker, P. "Wireless Advertising in the Real World", ChannelSeven.com Newsbeat, downloaded from www.channelseven.com Jun. 5, 2000.*
Mack, A.M. "Going Local", Adweek, vol. 41, No. 28, Jul. 10, 2000, pp. 38-39.*
James, D. "It'll Be a Wireless, Wireless, Wireless, Wireless World", American Marketing Association Marketing News, vol. 34, No. 15, Jul. 17, 2000.*

(Continued)

Primary Examiner—Luke S Wassum

(57) ABSTRACT

A system and method for locating the present location of a mobile station and sending consumer information to the mobile station sorted based on distance between the establishments represented by the consumer information and the present location of the mobile station. The consumer information may be sorted so as to contain information of a certain classification or characteristic. Furthermore, the consumer information may be sorted according to user defined guidelines. The user of the mobile station may ask for a particular type of business close to the user's current location. This instant information system may match a user's location, defined preferences, and retailer's promotions to send the user instant information for goods or services.

17 Claims, 7 Drawing Sheets

OTHER PUBLICATIONS

Williams, A.M. "Promotional Messages Reach Customers on the Move", InformationWeek, No. 801, Aug. 28, 2000, p. 32.*

Ditlea, S. "Wherever You Go, Ads", Marketing Computers, vol. XX, No. 8, Aug. 2000, pp. 20+.*

BusinessWire "Alcatel to Demonstrate INsight Platform Using NearMe Wireless Application at M-Commerce 2000", Sep. 13, 2000, p. 2132.*

Robinson, T. "Wireless Applications—Location is Everything", InternetWeek, No. 829, Sep. 18, 2000, p. 49.*

Dixon, D. "Promise of Wireless: Location-Based Info", U.S. 1 Newspaper, downloaded from www.princetoninfo.com, Nov. 29, 2000.*

Sutherland, E. "Location-Based Ads in the Real World", M-Commerce Times, downloaded from www.mcommercetimes.com, Jan. 2, 2001.*

Wells, J. "Expert Analysis: Wireless in Retail", Retail Traffic Magazine, downloaded from bg.retailtraffic.com, May 1, 2001.*

NearMe "Welcome to NearMe", downloaded from www.nearme.com, May 16, 2001.*

BusinessWire "Mforma Acquires Laeading Mobile Technology Companies and Announces New Mserver Platform", Jul. 17, 2001.*

Vindigo "Vindigo for Your Business", downloaded from www. vindigo.com, Aug. 1, 2001.*

Vindigo "Location-Based Applications", downloaded from www.vindigo.com, Oct. 31, 2001.*

Vindigo "Our Technology", downloaded from www.vindigo.com, Oct. 31, 2001.*

Vindigo "Case Studies", downloaded from www.vindigo.com, Oct. 31, 2001.*

Vindigo "Help for PalmOS", downloaded from www.vindigo.com, Dec. 15, 2001.*

Vindigo "Advertise", downloaded from www.vindigo.com, Dec. 16, 2001.*

Vindigo "Vindigo Demo", downloaded from www.vindigo.com, various dates, none later than Dec. 18, 2001.*

Prabhakar, S., Y. Xia, D. Kalashnikov, W.G. Aref and S. Hambrusch "Query Indexing and Velocity Constrained Indexing: Scalable Techniques for Continuous Queries on Moving Objects", IEEE Transactions on Computers, vol. 51, No. 10, Oct. 2002, pp. 1124-1140.*

Moeller et al., "Communication Enabling Technologies I: The Enabling Technologies for Broadband Access to the Mobile Internet," Dain Rauscher Wessels, May 5, 2000.

Lasoo's ASP Solutions, 2001, Lasoo Inc.

The Entertainment Book, http://www.entertainment.com/index.cfm?fuseaction=visitorcoupon, May 7, 2001.

The Entertainment Book, http://entertain . . . /index.cfm?fuseaction=visitorcoupon&page=1&subcategory=&county=&offer_class='OCL0001',OCL0002, May 7, 2001.

Entertainment—Online Coupon, http://www.entertainmnet.com/print/coupon.cfm?ofseqno=889915&loseqno=275581, May 7, 2001.

* cited by examiner

SYSTEM AND METHOD OF SORTING INFORMATION BASED ON A LOCATION OF A MOBILE STATION

FIELD OF THE INVENTION

The present invention relates to mobile communications and, more particularly, to a method and system for providing electronic information to mobile stations.

BACKGROUND OF THE INVENTION

Retailers and manufacturers often sponsor incentive programs to persuade consumers to buy their products and services. These incentives include a wide variety of consumer information such as discount coupons, whereby a consumer may redeem the coupon when purchasing an associated product or service. Another incentive may include price deductions by discounting items by a designated percentage.

Traditionally, coupons and other consumer information have been distributed in a paper form in mass mailings or newspaper inserts. More recently, the marketing industry has begun to use the concept of an electronic coupon or "e-coupon," which can be distributed online much as coupons have been distributed via newspapers and mail packs. Electronic coupons can be displayed by displaying coupons online to a consumer and allowing the consumer to download the coupons to the consumer's personal computer.

Modern telecommunications systems have enabled a great deal of consumer mobility. Consumers may travel throughout local areas or across long distances and yet remain in communication with others via wireless or landline telephones, e-mail, instant messaging, audio and video conferencing, and other facilities. Cellular wireless is an increasingly popular means of personal communication in the modern world. People are using cellular wireless networks for the exchange of voice and data over cellular telephones, Personal Digital Assistants (PDAs), cellular telephone modems, and other devices. In principle, a user can seek information over the Internet or call anyone over a Public Switched Telephone Network (PSTN) from any place inside the coverage area of the cellular wireless network.

An important feature of contemporary cellular wireless networks is an ability to locate the geographical position of a mobile station. Such a feature was developed to assist emergency services in locating a mobile station. For example, in the United States, the Federal Communications Commission (FCC) has mandated the implementation of "Enhanced 911" ("E911") services, where the location of a mobile station must be identified with an accuracy of at least cell and sector, followed by an accuracy of at least 100 meters.

In many cases, having the ability to locate the position of a mobile station will lead to providing location-based services to mobile subscribers. This will involve (i) determining the position of the mobile station and (ii) providing the mobile station with a set of information representing establishments at or near that position. The user may request this information, or a service provider may periodically offer information to the user. The web service provider may obtain the mobile station's location and then provide the subscriber with a web page that lists the information located within a small distance from the mobile station's location.

Furthermore, the ability to identify the current position of a mobile station may allow providers in the vicinity to provide commercial services and information to the user of the mobile station through the cellular wireless network. Thus, the user of the mobile station may inquire about what services are offered in his vicinity, and the cellular wireless network will provide such information to the user. The user might then have the option of establishing a connection with any chosen provider and receiving the services offered by the provider.

Having such location-based services may allow a mobile station's user to inquire about services in any vicinity. For example, the Personal Communications Service (PCS) provided by the Sprint Spectrum, LP of Kansas City, Mo., allows the user to roam anywhere in the United States that is within the coverage of the Sprint PCS service. Thus, if the user is away from his home area, the user may activate a micro-browser on his mobile station and request consumer information such as coupons, advertisements, or general consumer information in his vicinity. General information may consist of, but is not limited to, store locations, store hours, and store services.

Cellular wireless carriers and third party application providers have thus recognized the commercial significance of this new-found location information, well beyond use of the information for emergency services. In particular, knowing where a mobile station is located, a service provider may now provide a wide range of valuable location based services. Merely as examples, a service provider can (i) help a mobile subscriber plan a route from the subscriber's current location to another designated location, (ii) inform the subscriber of services (e.g., restaurants, fuel stations, hotels, theatres, hospitals, etc.) in the subscriber's vicinity, and (iii) notify the subscriber of traffic conditions and weather conditions in the subscriber's vicinity.

Mobile electronic commerce (ME-commerce) is a growing industry for consumers using mobile stations. ME-commerce allows a consumer to obtain desirable information at any moment in time. This may provide consumers with alternative shopping methods. ME-commerce may provide real-time product price information as well. Furthermore, ME-commerce may assist a mobile station user by providing customer service and consumer information. However, a mobile station has a limited user output, either in the form of a small-size display or a voice generated output. This limited output restricts the amount of information which may be reasonably conveyed, thus limiting the usefulness of information sent to the consumer.

SUMMARY OF THE INVENTION

The present invention relates to a method and apparatus for compiling and distributing a sorted list of consumer information. According to an exemplary embodiment, the invention uses the present geographic location of a consumer's mobile station, and locates consumer information from establishments, and thereafter, sorts the information according to geographic proximity to the present location. The present location could vary from case to case but may, for example, be a particular network, a network address, a geographic address, a geographic position, or a cell and/or sector of a wireless telecommunications network. Moreover, the present location may be obtained from a variety of sources including a location determining system (such as a GPS system) or user input (such as an electronic scheduler in the form of a calendar function on a personal digital assistant or an itinerary for a trip). Also, the consumer information may be a coupon, an advertisement, or general consumer information.

The sorting of the consumer information may encompass several different embodiments. These embodiments include, but are not limited to: sorting based on a current location of the mobile station; sorting based on a past location of a mobile station; and sorting based on a projected location of the mobile station. In one embodiment, sorting based on a current location of the mobile station may include: sorting based on establishments closest to the current location; sorting based on whether establishments are in a sector; sorting based on time of day; sorting based on type of current location; and sorting based on user defined guidelines.

In another embodiment, the information may be sorted based on a past location of the mobile station. Examples of sorting based on a past location of the mobile station include, but are not limited to: sorting based on type of past location; and sorting based on user defined guidelines.

In still another embodiment, the information may be sorted based on a projected location of the mobile station. Examples of sorting based on a projected location of the mobile station include, but are not limited to: sorting based on whether establishments are in a projected path of the mobile station; sorting based on type of projected location; and sorting based on user defined guidelines.

The location of the sorting may also be performed in different places. In one embodiment, the sorting of information may take place at a server that may access a database. After sorting the information, the server may then send the information to the mobile station. In another embodiment, the sorting may take place at the mobile station that may access the database through the server or that may simply receive the information from the server (and then sort the information).

Advantageously, an apparatus or server may be in communication with a mobile station, so that a user of the mobile station can access and obtain information representing establishments near the user's present geographic location. For instance, as mentioned above, a web service provider might allow a user to query a data server for available coupons of all pizza restaurants located near the user's current location. The data server may sort the coupons in a database. As another example, a web service provider might allow a user to request information concerning grand openings of shoe stores near the user's current location. The data server might then send the requested location-based information to a micro-browser within the mobile station, and the micro-browser may cause the information to be displayed for viewing on the mobile station by the user. The data server may alternatively send the requested information in the form of an SMS (short message service) message. In still an alternate embodiment, the data server may send the unsorted information to the mobile station, and the mobile station may perform the sorting.

According to another aspect, an exemplary embodiment of the invention provides a consumer information server having a processor, a data storage medium, and a set of machine language instructions stored in the data storage medium and executable by the processor for performing a variety of functions. The functions may include establishing a list of consumer information after receiving a request from a mobile station, determining a present geographic location of the mobile station, sorting the consumer information, and distributing the consumer information to at least one mobile station.

These as well as other features and advantages of the present invention will become apparent to those of ordinary skill in the art by reading the following detailed description, with appropriate reference to the accompanying drawings.

DESCRIPTION OF FIGURES

An exemplary embodiment of the present invention is described herein with reference to the drawings, in which.

DETAILED DESCRIPTION OF AN EXEMPLARY EMBODIMENT

1. Overview

The present invention provides a system and method to allow a user of a mobile station to obtain sorted information based on the mobile station's current, past, or projected location. In one aspect, the system and method sorts consumer information within a close proximity of the user's current, past, or projected location.

Figure 1:
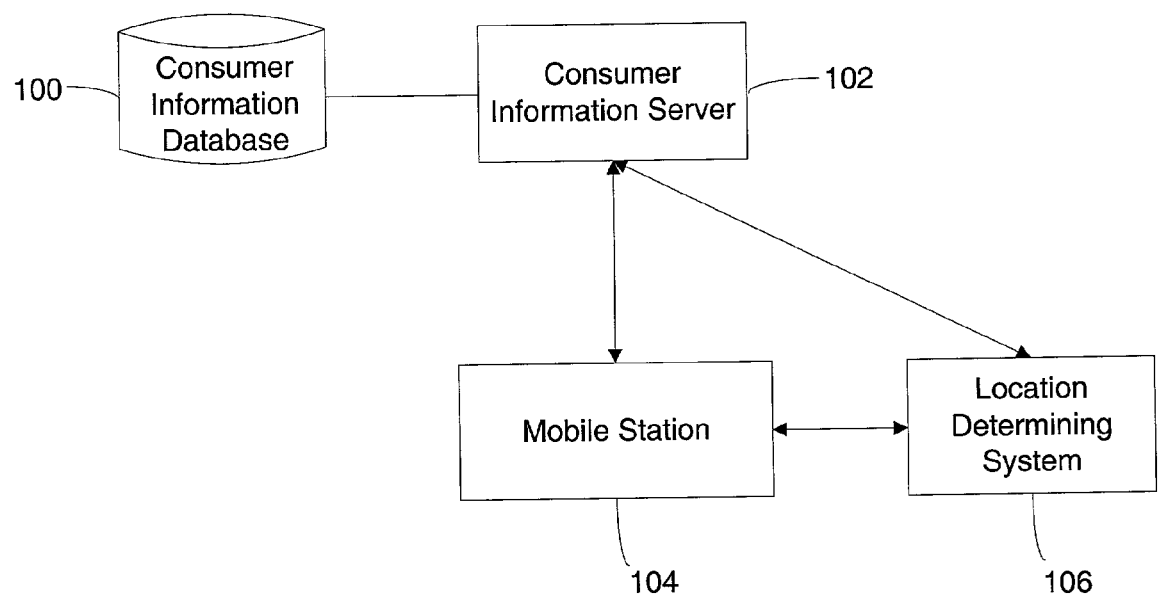
FIG. 1 is a block diagram illustrating a consumer information system arranged to operate in accordance with an exemplary embodiment of the present invention.

Referring to FIG. 1, a consumer information system is shown. A server 102 may include or be connected to a database of consumer information 100. The database of consumer information may contain coupons and/or general information from establishments relating to consumer based items and services. The server 102 can access the database 100 autonomously or upon a request to do so. A mobile station 104 may be in communication with the server 102 as well. The mobile station may be a cellular telephone, a personal digital assistant ("PDA"), a laptop computer, or any mobile device with communication means for connecting to the server 102. The mobile station 104 may access the consumer information 100 through the server 102 (e.g., the server may provide the consumer information to the mobile station). A location determining system 106 may be in communication with the mobile station 104 and the server 102. The server 102 may request the location determining system 106 to determine the present geographic location of the mobile station 104. The location determining system 106 may then return the geographic location information to the server 102. This and other arrangements described herein are shown for purposes of illustration only, and those skilled in the art will appreciate that other arrangements and other elements (e.g., machines, interfaces, functions, etc., whether or not separately known in the prior art) can be used instead, and some elements may be omitted altogether. Further, as in most telecommunications applications, those skilled in the art will appreciate that many of the elements described herein are functional entities that may be implemented as discrete components or in conjunction with other components, in any suitable combination and location. Still further, various functions described herein as being performed by one or more entities may be carried out by a processor executing an appropriate set of machine language instructions stored in memory. Provided with the present disclosure, those skilled in the art may readily prepare appropriate computer instructions to perform such functions.

Figure 2:
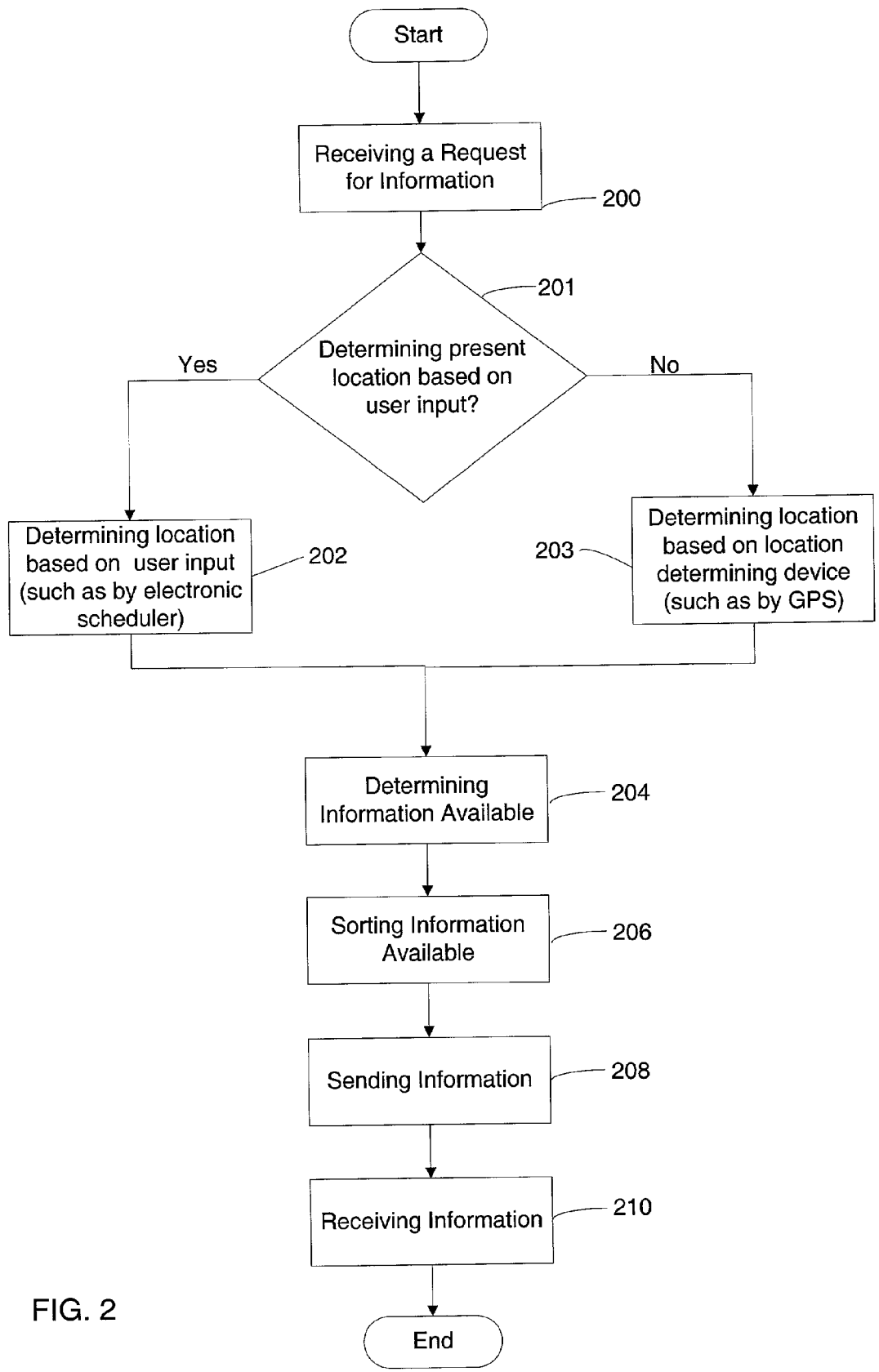
FIG. 2 is a flowchart depicting functional blocks of an exemplary embodiment of the present invention.

Referring to FIG. 2, a block diagram providing the method used in an exemplary embodiment of the present invention is shown. The user of a mobile station 104 may request consumer information from the server 102 in a network as shown at block 200. Alternatively, multiple mobile stations may requests consumer information from the server 102. The consumer information may be in a variety of forms, as mentioned. For example, the consumer information may be a coupon, which may be redeemable for purchases. The coupon preferably bears pertinent information, such as indications of (i) an issuing-merchant, (ii) a product or service, (iii) a promotion, (iv) an expiration date, (v) a coupon-identifying number, and (vi) other pertinent items. The consumer information may also be an advertisement, such as, an indication of a sale at a particular store. Furthermore, the consumer information may be general information beneficial for consumers.

Upon receiving a request for information, a decision is made as to whether the present location is based on user input, as shown at block 202. This function may be performed either by the server 102 or by the mobile station 104. The present location may consist of determining a network address, a geographic address, a geographic position, or a cell and/or a sector of a wireless telecommunications network. The step of determining a present location 202 may be done before or after the step of receiving a request for information 200. If the present location is determined based on user input, the location is determined using user input (such as by accessing an electronic scheduler), as shown at block 202. One such electronic scheduler is a calendar function in a PDA device. Another such electronic scheduler is an itinerary for a trip. The mobile station 104 or the server 102 may communicate with the PDA device to determine, for a certain time period, the scheduled location (either exact address, the city location, etc.) of the mobile station 104. Likewise, the itinerary for the trip may be accessed to determine what the scheduled location of the mobile station 104 is. Alternatively, the location may be determined using a location determining system 106, such as a GPS system, as shown at block 203.

Once the present geographic location of the user of the mobile station 104 has been determined, consumer information from establishments within a pre-determined distance from the present location may be compiled as shown at block 204. For example, the server 102 may search for consumer information within an area of five square miles centered on the present geographic location of the mobile station 104. In an alternate embodiment, the server 102 may search for consumer information within a distance of five miles from the present geographic location. The distance of five miles is based on actual travel distance (traveling on the roads), instead of distance point-to-point (i.e., as the crow flies). Alternatively, the server 102 may search a larger area, such as an entire city, for consumer information requested. The consumer information may then be sorted as shown at block 206. In the preferred embodiment, the information may be sorted into a list based upon the distance between (i) the establishment represented by the information and (ii) the present location of the mobile station 104. The consumer information may be arranged such that the information at the beginning of the list is closest in geographic proximity to the present geographic location of the mobile station 104, and the information at the end of the list is furthest in geographic proximity from the present location of the mobile station 104. This arrangement may give the user a list of consumer information within a range of distances from the user's present geographic location.

Figure 7:
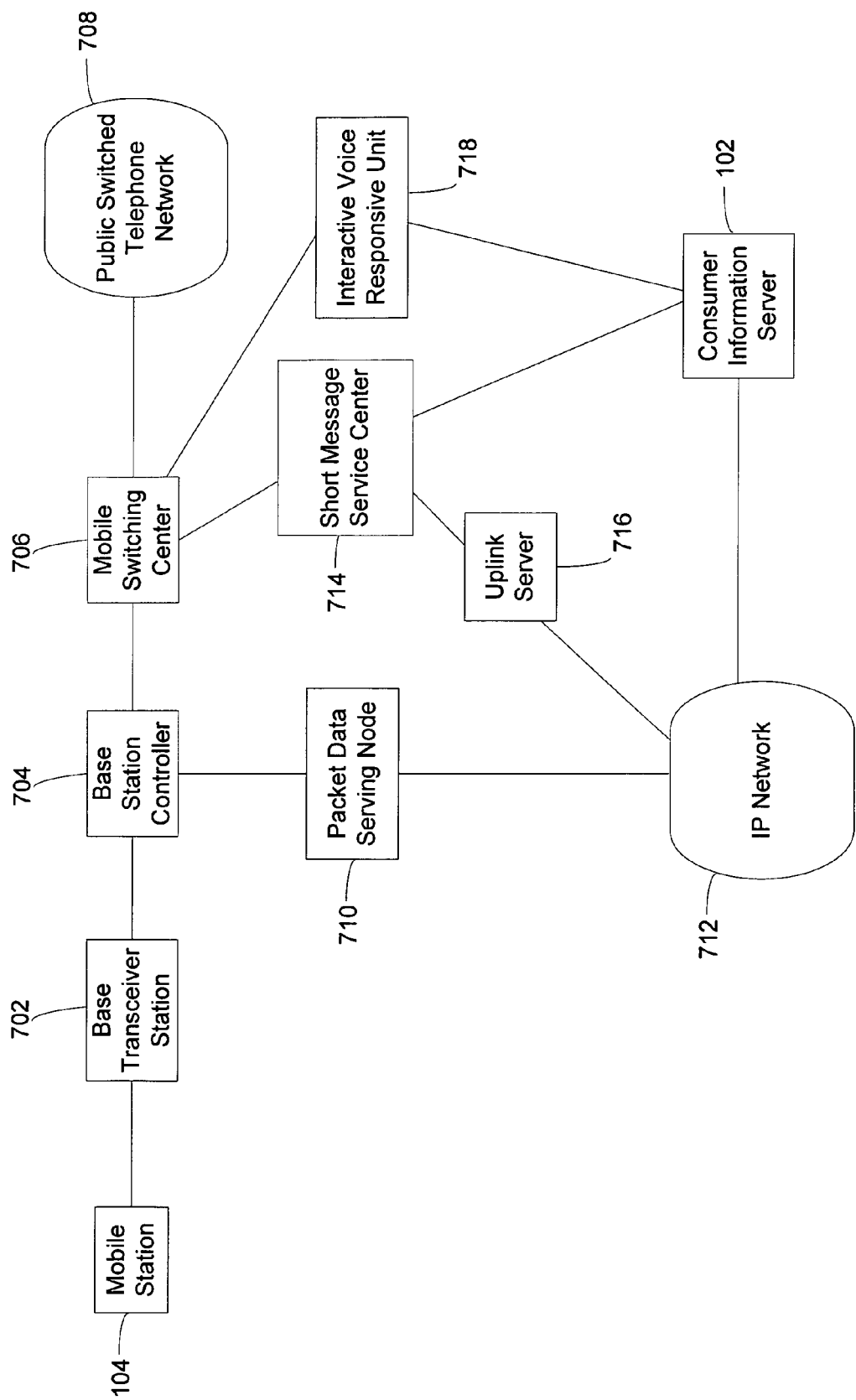
FIG. 7 is a block diagram of a cellular wireless system arranged to implement a portion of the exemplary embodiment shown in FIG. 1.

The sorted list of information, or a portion of the sorted list, may then be sent by the server 102 to the mobile station 104 as shown at block 208 (the process of sending is later described with reference to FIG. 7). Subsequently, the information may be received by the mobile station 104 as shown at block 210. The mobile station 104 may then display the information in a format acceptable by the device. Alternatively, the function performed at block 206 may be performed after the mobile station 104 receives the information from the server 102. Specifically, the server 102 may send the unsorted list of information, or a portion of the list, to the mobile station 104 and the mobile station 104 may thereafter sort the information.

As used herein, the term "display" (and variations of that term) can broadly be defined as to "present for viewing". In this regard, the information may be "displayed" even if only part of the information is viewable at a time, provided that the remainder of the information can be viewed as well (e.g., by a user scrolling through the information or moving a sliding window over the information). Thus, for example, a text document or graphic can be "displayed" on a display screen, even though only a portion of the text document or graphic is actually viewable at once, provided that the remainder of the text document can be viewed as well, through the use of a scroll bar or scroll keys, for instance.

As an example of the method shown in FIG. 2, a user of a cellular telephone may want to go to a restaurant. The user may first request coupons from the server to use at a restaurant. The server may then determine the present geographic location of the user, and determine all of the available coupons, within a database of coupons, for restaurants that are in a five-mile radius of the present geographic location of the user. The server may then sort the coupons into a list based on the distance between the restaurants represented by the coupons and the present geographic location of the user. The server may then send the sorted list of coupons to the user of the mobile station. The mobile station may receive the sorted list of coupons and the device may then display the coupons on a screen for viewing by the user. The user may scroll through the coupons and determine which coupons are of interest.

2. Functionality a. Sorting Consumer Information

In one embodiment, the sorting of information may take place at the server that may access the database. After sorting the information, the server may then send the information to the mobile station. In another embodiment, the sorting may take place at the mobile station that may access the database through the server. The mobile station may receive a set of coupons or information, and thereafter, the mobile station may sort based on position. Furthermore, the sorting of the consumer information discussed in the method of FIG. 2 may encompass several different embodiments. Examples of sorting that may take place include, but are not limited to: sorting based on a current location of the mobile station; sorting based on a past location of a mobile station; and sorting based on a projected location of the mobile station.

As discussed, the information may be sorted based on a current location of the mobile station. Examples of sorting based on a current location of the mobile station include, but are not limited to: sorting based on establishments closest to the current location; sorting based on whether establishments are in a sector; sorting based on time of day; sorting based on type of current location; and sorting based on user defined guidelines.

In another embodiment, the information may be sorted based on a past location of the mobile station. Examples of sorting based on a past location of the mobile station include, but are not limited to: sorting based on type of past location; and sorting based on user defined guidelines.

In another embodiment, the information may be sorted based on a projected location of the mobile station. Examples of sorting based on a projected location of the mobile station include, but are not limited to: sorting based on whether establishments are in a projected path of the mobile station; sorting based on type of projected location; and sorting based on user defined guidelines. The following are some examples of the types of sorting.

As discussed above, in one embodiment, the information may be sorted based on proximity to current location. One example of this is sorting of coupons based on the distance between the establishments represented by the coupons and the present geographic location of the user of a mobile station (i.e., sorting based on establishments closest to the current location). For example, a user may be located at 100 N. Street, and consumer information may be available from establishments located at 200 N. Street, 400 N. Street, and 150 N. Street. The information may be sorted in a manner which lists the information representing establishments starting with the information representing the establishment located at 150 N. Street, and ending with the information representing the establishment location at 400 N. Street. The information that represents establishments closer to the location of the user may be listed first; followed by the information that represents establishments further away.

Another example of sorting based on current location is sorting information based on the distance of other users to the current location of the mobile station. A database of information may contain the present geographic location of some or all the users of many service providers. A specific user may then request information from the database concerning the present location of other users. The server may then sort the existing user location information based on proximity of another user's present geographic location to the present geographic location of the requesting user. The location information may be sorted by listing those users closest in geographic proximity to the requesting user first, followed by the remaining users in order of distance from the requesting user.

Figures 3A, 3B:
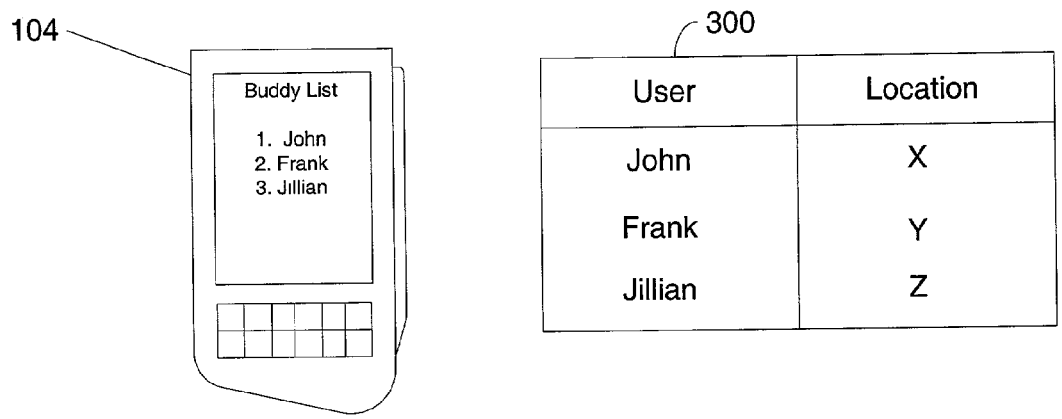
FIG. 3A is another information database as shown in FIG. 1 arranged to operate in accordance with an exemplary embodiment of the present invention.
FIG. 3B is a consumer information database as shown in FIG. 1 arranged to operate in accordance with an exemplary embodiment of the present invention.

In another embodiment, a "buddy list" may be maintained by a first user to locate the mobile stations of specific users so that the first user may determine the whereabouts of friends of the first user. For example, the signals which identify a particular mobile station may be stored in database 100 in order to identify the mobile station of the first user and the mobile stations of the specific users. The locations of some or all of the mobile stations of the specific users may be located, and the locations may be sorted based on distance between the location of the first user and the locations of the specific users. Referring to FIG. 3A, there is shown a mobile station 104 in the form of a PDA. The first user of the PDA may create a buddy list by compiling a list of mobile stations of specific users. The list of mobile stations of specific users may be transmitted to a location database 300 of a server. The location database 300 may include information in order to identify the mobile stations of the first user and the mobile stations of the specific users. The first user may then request the location of some or all of the specific users on the buddy list. Alternatively, the location of some or all of the specific users may be received by the PDA automatically without a prior request from the user. The location database 300 may contain, or have the ability to obtain, the present geographic location of some or all of the specific users on the buddy list. The location information may, in one aspect, be obtained by contacting service providers of mobile stations. The locations of some or all of the users may then be sorted with respect to the location of the requesting user, and this information may be sent to the first user's mobile station. The first user's mobile station receives the information and displays at least a portion of it on the PDA 104. Alternatively, the locations of some or all of the specific users may be sent to the first user's mobile station and thereafter at least a portion of the specific users may be sorted at the first user's mobile station. In one aspect, the sorting is based upon the distance between the location of the first user and the locations of the specific users. As shown in FIG. 3A, the buddy list is composed of at least three users: Frank, John and Jillian. The locations of the specific mobile stations assigned to Frank, John and Jillian are determined, sorted and displayed. As shown in FIG. 3A, user John is closest to the first user while user Jillian is farthest from the first user.

In still an alternate embodiment, a "buddy list" may be maintained by a first user to determine a meeting location. For example, the signals which identify a particular mobile station may be stored in database 100 in order to identify the mobile station of the first user and the mobile stations of the specific users. In addition, it may be determined whether the particular mobile station in the "buddy list" is available for communication. In one aspect, available for communication entails determining whether the mobile station is activated and able to receive a message. Once it is determined which of the mobile stations in the "buddy list" are available for communication, a location or a set of locations may be determined. The locations are selected by server 102 and thereafter, at least a portion of the available locations are sent to the available mobile stations. The choice of location(s) may be based on several criteria including: (1) distance from each of the available mobile stations in the "buddy list;" (2) desired activity; and/or (3) time of day. As merely one example, a location may be determined based on the geographic distance of the mobile stations to a central location. This distance may be calculated based on the actual distance traveled on the road. Alternatively, the distance may be calculated point-to-point (i.e., as the crow flies). In addition, the location may be determined based on an activity. If the activity is dinner, the location may be based on a consumer location, such as a restaurant, which is a "convenient" location for each of the available mobile stations on the buddy list. Convenience may be defined as the central location for the available mobile stations. The server 102 may download a predetermined number, such as three, of restaurant locations to the mobile stations. The server 102 may further download additional information to the mobile stations, such as distance to the restaurant, type of restaurant, address of restaurant, and directions to the restaurant. A specific user of one the available mobile station may select one of the options (e.g., one of the three restaurants) which is sent to the server 102. The server 102 may then transmit this selection along with the name or other identification of the specific user to each of the other available mobile stations. Alternatively, each of the users may select a location which is transmitted to the server 102. The server 102 then determines, based on the responses from the available mobile stations, which selection is most favored (such as by democratic vote), and transmits the most favored selection to the available mobile stations. Further, the location may be selected based on the time of day and/or type of activity. For example, if the activity is dinner, consumer locations which are not available for dinner are not selected.

In another embodiment, sorting may be done according to distance from the location of the mobile station. Information may be selected from establishments within a pre-determined surrounding area of the location of the mobile station, where the location of the mobile station may represent the geometric center of the pre-determined area. Furthermore, information may be selected from establishments based on the distance of the establishments from the location of the mobile station, where the distance may be greater than a first pre-determined amount and less than a second pre-determined amount.

In another embodiment, the consumer information from establishments within a sector of the location of the mobile station's location may be selected. The sector may be of a pre-determined angle width, such as 30° for a narrow sector, or 80° for a broad sector. This may provide the user with a larger selection of consumer information. For example, a surrounding area of the mobile station's location may contain establishments. Consumer information from these establishments that are within the sector may be sent to the mobile station, providing the user with the information.

In another embodiment, where multiple establishments are present in one building or one location, consumer information may be sorted according to the floor of the establishments represented by the consumer information. For instance, in a high-rise skyscraper, restaurants may be present on the first, third, tenth, and fifteenth floors. Consumer information representing these restaurants may be available for a user of a mobile station. The consumer information may be sorted by listing the coupons available for the restaurants on the lower floors first, followed by coupons available for the restaurants on the higher floors.

In another embodiment, sorting of available consumer information may be based on the time of day or time of year. For instance, at lunchtime, approximately noon, the database may sort restaurant information to be sent to the mobile station for viewing by the user. As another example, prior to Valentine's Day, the database may sort flower shop information to be sent to the mobile station for viewing by the user. This information may be sent either with or without a request from the mobile station.

In another embodiment, the server may sort consumer information based upon user defined guidelines. There are many example of user guidelines. One example is sorting based on classification of establishments. For example, the server may separate the coupons contained within the database into two groups of coupons; certificates redeemable for services and certificates redeemable for tangible items. When sent to the user, the consumer information may be sorted based on the distance between the respective establishments represented by the information and the present geographic location of the user of the mobile station.

As discussed above, sorting may be based on a past location. One example is sorting based on type of past location. For example, the type of the past location may be a restaurant or a clothing store. In particular, if someone is eating at a restaurant, the person may wish to eat desert immediately after dinner. In this case, consumer information regarding desert establishments may be disseminated to the user. This situation was discussed previously. Alternatively, a person eating in a restaurant may wish to eat desert at a later time, for example, one-hour after finishing dinner. In this situation, the information database may determine a past location of the user's mobile station (e.g., restaurant, etc.), and then determine establishments present within a pre-determined area of the present location that may be related to the past location (e.g., desert shop, etc.). As another example, if someone is eating at a restaurant, the person may wish to go to a movie theater after dinner. Locations of movie theaters may be disseminated to the user. Thus, the database may determine a present activity that the user may participate in, following the user's past visit to specific establishments within the area, and send information based on assumed knowledge of the activities of the user.

Another example of sorting based on past location is sorting based on user defined guidelines. Depending on preferences, a user may desire to have a reminder for an oil change in three months in the form of consumer information for automotive repair shops. Based on a past location of the mobile station at a repair shop, information regarding automotive repair shops may be provided approximately or exactly three months from that time. The repair shop consumer information may be given for a predetermined repair shop (such as a specific chain of repair shops or a specific location of a repair shop) or may be given based on the current location of the mobile station.

In still another embodiment, the database may be able to track the amount of distance that the user may travel in one day by using a real-time present location history. The database may send information relating to establishments to assist in the user's traveling. For instance, using the location history, the database may determine that a user of a mobile station may have traveled over 200 miles or a pre-set distance within the database, and the database may then sort gas station coupons for the user. Other information relating to buses, subways, trains, airplanes, and other transportation related information might be sorted as well based on the distance traveled by the user.

As discussed above, sorting may be based on a projected location. One example is sorting based on whether establishments are in a projected path of the mobile station. The sorting of the consumer information may be done using a real-time location history of the mobile station to project future routes and locations where the mobile station user may visit. In this embodiment, consumer information from establishments of a future geographic location may be selected and sorted for the user of the mobile station. A trajectory of a path that the user of the mobile station may travel can be determined from the real-time location history using point to point analysis. After receiving two or more geographic locations of the mobile station within a pre-determined amount of time, a path or trajectory may be calculated to predict the course of the mobile station. Based on this trajectory, establishments within a predetermined distance of the trajectory may be made available for the user to use upon arriving at the future location. For example, if a user is traveling due north, coupons for establishments (such as restaurants) located within 5 miles of the due north projection may be obtained. In an alternate embodiment, both the trajectory and the velocity of the mobile station may be determined so that establishments within a predetermined distance from the projected path and a predetermined distance from the current location may be obtained. For example, if a user is traveling due north at 50 mph, restaurant establishments which are (1) within 5 miles of the due north trajectory; and (2) between 25 to 50 miles of the current location of the mobile station. In this manner, if a user wishes to eat at a restaurant in the next 30 to 60 minutes, the user may have the available restaurants.

Another example of sorting based on a projected location is sorting based on user defined guidelines. The user defined guidelines may be the same as previously discussed, and may be used to limit or restrict the amount of information to be sent to the user.

Some of the above embodiments may require the information to list an address of the establishment represented by the information. This may help the user of the mobile station locate the establishment represented by the information. For example, when sorting information based on a projected future location of the user of a mobile station, the address of the information may be useful in determining the location of the establishment to visit. Furthermore, some of these embodiments may require the server to take the initiative of sorting and sending information to a mobile station without a request for information by the mobile station as mentioned earlier.

b. Selecting Consumer Information

Figure 4:
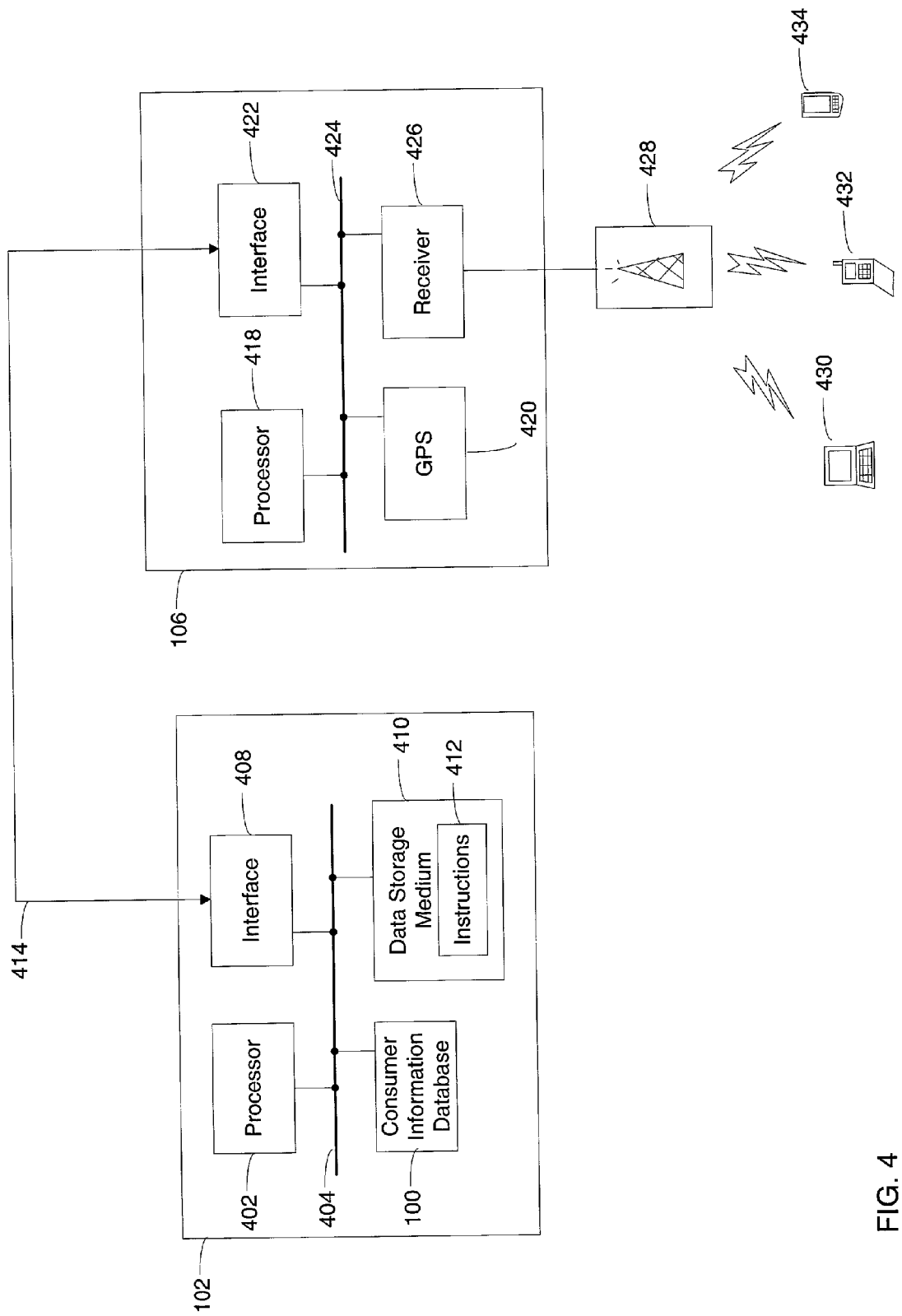
FIG. 4 is a mobile communication information system employing the method of FIG. 2 in accordance with an exemplary embodiment of the present invention.

Referring to FIG. 4, a mobile communication system is shown. The server 102, as discussed above, may contain data storage medium 410, for storing a set of machine language instructions 412. The instructions 412 may be executable by a processor 402 in response to a consumer information request from a mobile station 104. Examples of mobile stations may be a laptop computer 430, a cellular telephone 432, or a PDA 434. The instructions 412 may be operable to perform functions including, but not limited to: applying the location determining device 106 to determine a present geographic location of the mobile station 104; selecting from the consumer information database 100 a set of consumer information for a set of establishments based on the present geographic location of the mobile station 104; sorting the set of consumer information into a list based on geographic proximity of the establishments to the present geographic location of the mobile station 104; and sending at least a portion of the list of consumer information to the mobile station 104. The consumer information database 100 may contain a large amount of consumer information for many different respective establishments.

In the preferred embodiment, the server 102 may further contain an interface 408 for communicating with the location determining system 106. The server 102 may also be in communication 414 with the location determining system 106. This communication tie 414 may be a physical connection, or the communication tie 414 may be done using wireless techniques.

The location determining system 106 may contain an interface 422 for communicating with the server 102. The location determining system 106 may also contain a processor 418 for operation within the system. In one embodiment, the location determining system 106 may include a GPS (global positioning system) 420. Furthermore, the location determining system 106 may contain a receiver 426 for use in communicating with the mobile station through an antenna 428. Alternatively, the location of the mobile station may be determined using an electronic scheduler. As discussed previously, either the server 102 or the mobile station 104 may determine the location of the mobile station 104 via an electronic scheduler, which may contain the location of the mobile device. For example, if an itinerary for a trip is contained in the electronic scheduler, the itinerary may include the location of the hotel (including address), the location(s) of scheduled appointments during the trip, etc. This location information may be used to determine a past, present, or future location of a mobile station 104.

The server 102 may select consumer information, prior to sorting, based upon several criteria, such as user defined guidelines. For example, a user may request coupons for a certain type of product (e.g., cereal, pizza, dog food, etc.), for certain criteria (e.g., two-for-one specials, minimum coupon value, etc.), and/or from certain vendors or service providers (e.g., specific restaurants, specific grocery stores, etc.). The consumer information database 100 may be sub-divided to assist in the sorting of the consumer information. Referring to FIG. 3B, the database may be divided into consumer information related to products 302 and consumer information related to services 304. Examples of product information 302 may be grocery items, clothing or shoes, and electronic items. Examples of service information 304 may be automotive repair information, restaurant information, and hair salon information. The product information 302 and the service information 304 may be sub-divided into categories based on the information. For instance, coupons may be placed into one category, while advertisements may be place into another category. Thus, prior to sorting, the consumer information may be segmented.

Another embodiment may select consumer information based on the type of current location. For example, if the current location is determined to be a grocery store, consumer information, such as coupons, may be sorted and sent to the mobile station. As one example, if the current location is determined to be a specific type of store, such as Wal-Mart®, coupons directed to the type of store may be sent to the mobile station. As another example, upon determining that a user of a mobile station is at a location of a restaurant, the database may sort and send consumer information for desert establishments, such as ice cream parlors, because it may be assumed that the user may visit an ice cream parlor establishment after the restaurant establishment. As a further example, the database may determine that a user of a mobile station is at a clothing store. Given the assumption that a consumer may wish to purchase shoes in addition to clothing, the database may then select consumer information for shoe stores, sort the shoe stores within the area of the clothing store and then send consumer information.

c. Determining Present Location

The server 102 may determine the location of a mobile station using many different methods. Examples of broad categories of location determination technologies that may be used within the present invention include, but are not limited to: network based solutions; handset-based solutions; and hybrid solutions. Still other location determination methods may be used as well.

Figure 5:
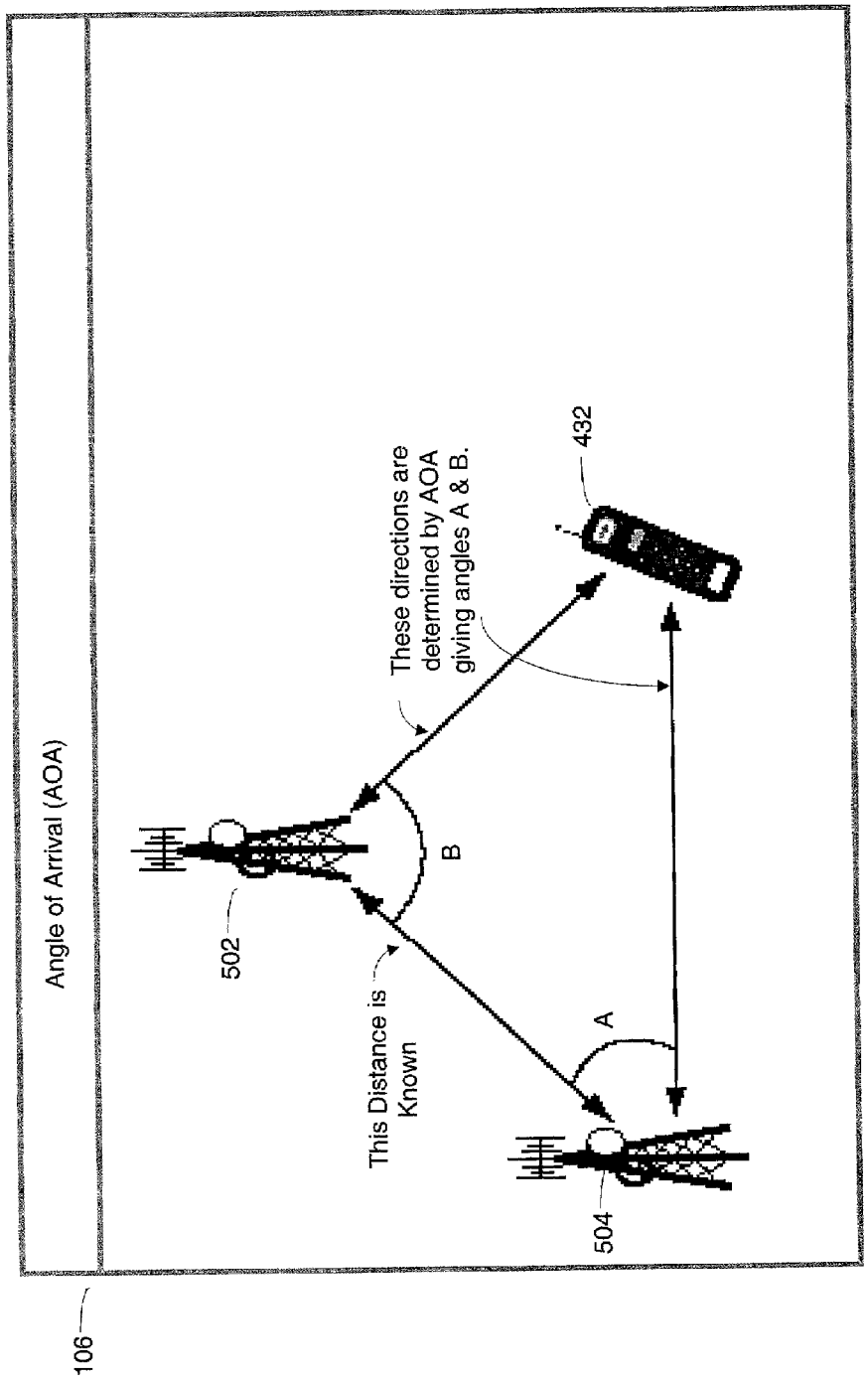
FIG. 5 is a diagram illustrating a location determining system as described in FIG. 1.

Network-based solutions rely on a user's network to determine how far a subscriber is from the network's base stations, thus giving location. Two network-based technologies are angle of arrival (AOA) and time difference of arrival (TDOA). As shown in FIG. 5, AOA uses simple trigonometry to determine a subscriber's location. In theory, AOA can give an exact location. In practice, there may be errors associated with determining the angles of the arriving signal, and these errors may increase with distance, as they disperse. Deploying antenna arrays may reduce these errors. Smart antennas may reduce these errors even further and thus increase the range of AOA solutions. As shown in FIG.

5, two antennas are needed to determine the incoming angles of the arriving signals from the mobile station.

Once the angles between the first base station antenna 502 and the cellular telephone 432, and the second base station antenna 504 and the cellular telephone 432 have been determined, as shown in FIG. 5 as angles A and B, the distance of the cellular telephone 422 can be determined using trigonometry. The distance between the antennas is also necessary, but since the antennas are stationary, the distance between them is known. The position and location of the antennas are known as well, therefore, once the distance of the cellular telephone 432 from the antennas is known, then the present position and location of the cellular telephone 432 can be determined.

Figure 6:
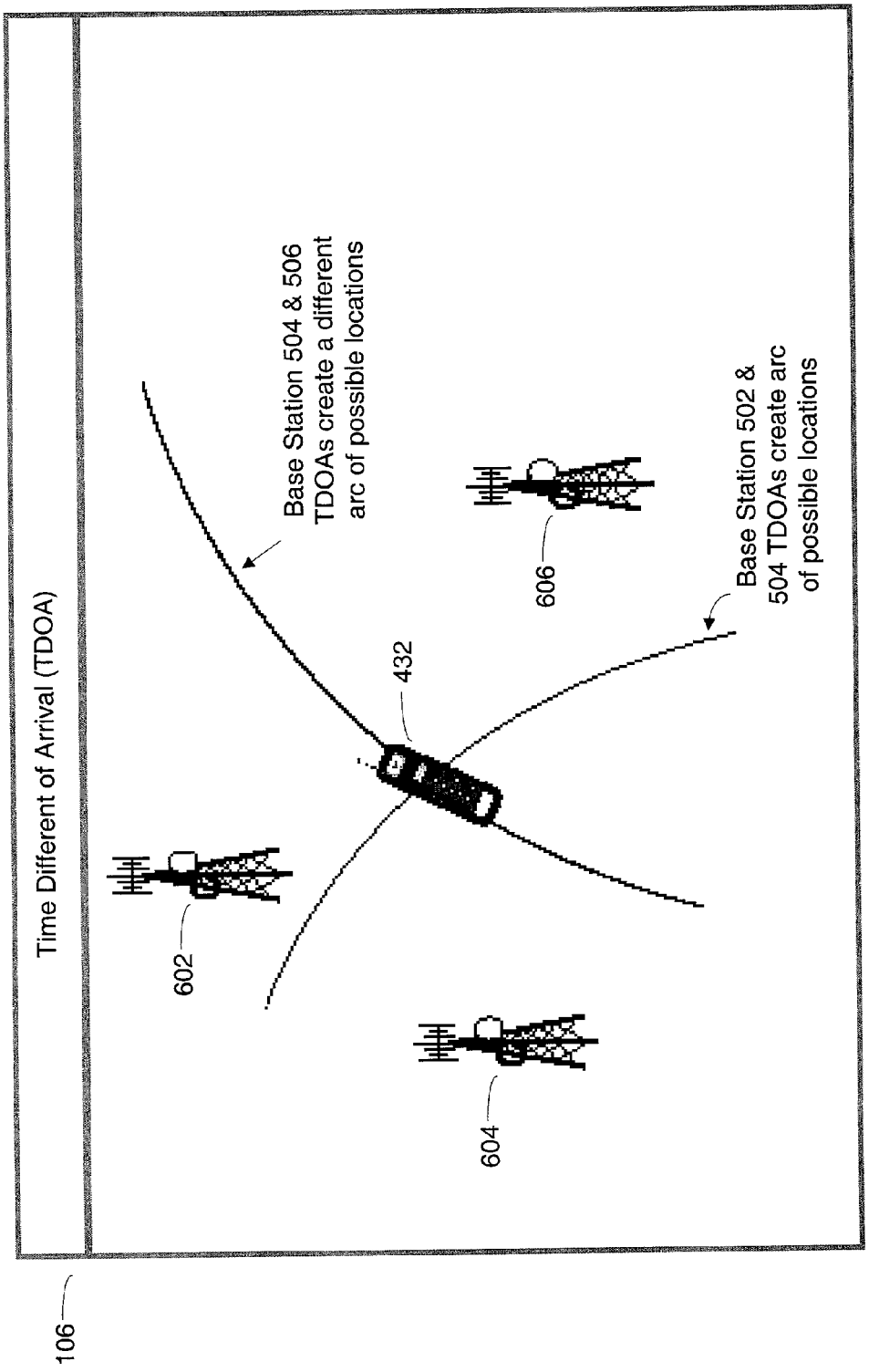
FIG. 6 is a diagram illustrating a location determining system as described in FIG. 1.

In another embodiment, TDOA may be used to determine the location of mobile stations. TDOA is illustrated in FIG. 6. TDOA uses the difference in the signal arrival times at one base station antenna 602 with another base station antenna 604 to calculate an arc of possible locations. By creating a similar arc with a third base station antenna 606, the approximate location of a mobile station can be established. The location of the cellular telephone 432 will be based on the intersection of the two arcs formed. As before, the position and distance between the antennas must be known, but since the antennas are stationary, the distance between them and their positions are known. Once the intersection of the two arcs is found, the distance of the cellular telephone 432 from the antennas can be determined, and the present position and location of the cellular telephone 432 can be found.

In another embodiment, handset solutions for determining locations of mobile stations may be used with the Global Positioning System (GPS) satellite navigation system. Each mobile station used in the system may require a GPS receiver, which may be typically implemented in an integrated circuit in the mobile station. An advantage of this solution is its ubiquity, in that the GPS system is available almost everywhere. A location determining device may be communicably connected to the mobile station at all times.

In another embodiment, the hybrid approach for determining locations of mobile stations may be used. The hybrid method may use GPS receivers in the telecommunications network to determine the location of GPS satellites. The network may transmit this information to the mobile station, and the mobile station may take a snapshot of the GPS signal, calculate the distance to the satellites, and send this information back to the server. The server may then calculate the exact location of the mobile station based on the reference signal of the GPS satellites.

d. Sending Consumer Information

As previously described, once the geographic location of the mobile station is determined, the consumer information server may determine the available information, sort at least a portion of the information, and ultimately send at least a portion of the sorted information to the mobile station. Referring to FIG. 7, a simplified block diagram of a cellular wireless system is shown. The consumer information server 102 may communicate to the mobile station (MS) 104 through the system in three different ways. In one embodiment, the server 102 may send consumer information to mobile station 104 by using IP (Internet protocol) network 712. The server 102 may send information via the IP network 712, which may communicate with the PDSN (packet data service node) 710 to communicate with the BSC (base station controller) 704. The BSC 704 provides Internet connectivity to the mobile station 104 through the BTS (base transceiver station) 702. Of course, still other entities may be connected with the IP network 712 as well or instead.

Another embodiment of the server 102 communicating with the mobile station 104 is via the IP network 712 to the Uplink Server 716. The Uplink Server 716 may send a Net Alert in an SMS (short message service) message via an SMSC (short message service center) 714 to an MSC (mobile switching center) 706. The MSC 706 may communicate with the mobile station 104 through the BSC 704 and the BTS 702 as before. As is known in the art, SMSC 714 serves to store and forward SMS messages to or from SMS-capable entities. Examples of such entities might include the mobile station 104, and SMS clients (e.g., e-mail clients) residing on entities such as consumer information server 102. Other examples are possible as well.

Still another embodiment of the server 102 communicating with mobile station 104 is with an SMS message being sent via SMSC 714, which communicates with MSC 706. Once again, MSC 706 communicates with mobile station 104 through BSC 704 and BTS 702 as before.

Yet still another embodiment of the server 102 communicating with mobile station 104 is with using an interactive voice response. The server 102 may communicate with the MSC 706 via an IVRU (interactive voice response unit) 718. The IVRU 718 may include a voice browser and/or voice-recognition engine so that the user of the mobile station 104 may use his/her own voice or the keypad on the mobile station 104 to communicate with the server 102.

3. Micro-browser

In one embodiment, the consumer information server 102 may communicate with a mobile station 104 through the IP network 712. Since much of the value of the mobile Internet is in applications and information that already exist in the wireline Internet, methods for adapting this content to the wireless environment may be necessary. One may reauthor the Web site to support wireless devices and protocols. In another embodiment, scripts may be used that automatically extract and format the data requested. Still, in another embodiment, markup tags can be incorporated into the content for the various mobile devices that may access the information.

In the embodiment wherein the consumer information is sent to the mobile station 104 via a web page, a micro-browser may be used by the mobile station 104 to view the consumer information. The micro-browser is one application that enables a mobile station 104 to exchange instructions with network devices on the Internet. For example, the micro-browser may exchange instructions with a server to perform functions requested by the user. The micro-browser may also interpret instructions received by the server that describe the layout and content of the display screen. In one embodiment, a user of a mobile station 104 may communicate with a server 102 through a micro-browser by selecting an item on a list of consumer information by pressing the corresponding number key on the numeric character-entry device. Alternatively, the user may scroll to the item (usually by highlighting it) and then press a softkey to engage the desired function. In response, the browser may display the item or take another designated action associated with the selected item.

CONCLUSION

An exemplary embodiment of the present invention has been illustrated and described. Those skilled in the art will understand, however, that changes and modifications may be made to the invention without deviating from the scope of the invention, as defined by the following claims. Further, the claims should not be read as limited to the described order of elements unless stated to that effect.

I claim:

1. A computer-implemented method performed on a server comprising:
    determining that a mobile station has traveled a predetermined distance;
    selecting a set of coupons;
    sending at least a portion of the set of coupons to the mobile station;
    sorting at least a portion of the set of coupons sent to the mobile station, the sorting based on a current location of the mobile station, so as to establish a sorted set of coupons; and
    outputting at least a portion of the sorted set of coupons.

2. The method of claim 1, wherein the mobile station performs the step of sorting at least a portion of the set of coupons sent to the mobile station.

3. The method of claim 1, wherein the step of outputting at least a portion of the sorted set of coupons includes displaying the at least a portion of the sorted set of coupons.

4. The method of claim 1, further comprising determining the current location of the mobile station.

5. The method of claim 4, wherein determining the current location of the mobile station includes determining the location using a Global Positioning System.

6. The method of claim 4, wherein determining the current location of the mobile station is based on user input.

7. The method of claim 6, wherein the user input includes an electronic scheduler.

8. The method of claim 1, wherein outputting the at least a portion of the sorted set of coupons comprises displaying the at least a portion of the sorted set of coupons on the mobile station.

9. The method of claim 1, wherein the coupons selected represent establishments within a pre-determined distance from the current location of the mobile station.

10. The method of claim 1, wherein sorting comprises sorting based on distance between establishments represented by the set of coupons and the current location of the mobile station, the distance being greater than a first pre-determined distance and less than a second pre-determined distance.

11. The method of claim 1, wherein sorting comprises sorting the set of coupons based on user defined guidelines.

12. The method of claim 1, wherein sorting comprises sorting the set of coupons based on at least one past location of the mobile station.

13. The method of claim 1, wherein sorting the least a portion of the set of coupons includes:
    determining a trajectory of the mobile station based on at least the one past location and the current location of the mobile station; and
    identifying coupons from establishments located within a predetermined distance of the trajectory.

14. A mobile consumer information system comprising in combination:
    a processor;
    a database of consumer information, the consumer information being for respective establishments at respective geographic locations;
    location determining device;
    data storage medium;
    wherein the processor, the database of consumer information and data storage medium are within a server; and
    a set of machine language instructions stored in the data storage medium and executable by the processor in response to a consumer information request from a mobile station, to perform functions including:
        applying the location determining device to determine a present geographic location of the mobile station;
        determining that the mobile station has traveled a predetermined distance;
        selecting from the database a set of consumer information for a set of establishments; and
        sending at least a portion of the set of consumer information to the mobile station.

15. The mobile consumer information system of claim 14, wherein selecting from the database a set of consumer information for a set of establishments comprises searching the database for establishments within a pre-determined distance from the present geographic location of the mobile station.

16. The mobile consumer information system of claim 14, wherein the set of machine language instructions is further executable to sort the set of consumer information into a list of consumer information based on geographic proximity of the establishments to the present geographic location of the mobile station.

17. The mobile consumer information system of claim 16, wherein the sorting of the consumer information into a list comprises sorting consumer information for an establishment closest to the present geographic location at a beginning of the list.

* * * * *